(12) United States Patent
Hochapfel et al.

(10) Patent No.: US 9,538,773 B2
(45) Date of Patent: Jan. 10, 2017

(54) APPARATUS AND METHOD FOR PRODUCING CHOCOLATE CORES

(71) Applicant: CHOCOTECH GmbH, Wernigerode (DE)

(72) Inventors: Birk Hochapfel, Wernigerode (DE); Erhard Hilker, Lemgo (DE)

(73) Assignee: CHOCOTECH GMBH, Wernigerode (DE)

(*) Notice: Subject to any disclaimer, the term of this patent is extended or adjusted under 35 U.S.C. 154(b) by 49 days.

(21) Appl. No.: 13/952,732

(22) Filed: Jul. 29, 2013

(65) Prior Publication Data
US 2014/0030410 A1 Jan. 30, 2014

(30) Foreign Application Priority Data
Jul. 30, 2012 (DE) .................. 10 2012 106 903

(51) Int. Cl.
| | |
|---|---|
| A23G 1/20 | (2006.01) |
| A23G 1/00 | (2006.01) |
| A23G 3/34 | (2006.01) |
| A23G 3/02 | (2006.01) |
| A23G 7/00 | (2006.01) |

(52) U.S. Cl.
CPC ............ *A23G 1/0063* (2013.01); *A23G 1/20* (2013.01); *A23G 1/205* (2013.01); *A23G 1/206* (2013.01); *A23G 1/207* (2013.01); *A23G 3/007* (2013.01); *A23G 3/0025* (2013.01); *A23G 3/0252* (2013.01); *A23G 3/0257* (2013.01);
(Continued)

(58) Field of Classification Search
CPC .. A23G 3/0252; A23G 1/0063; A23G 1/0069; A23G 1/20; A23G 1/201; A23G 1/202; A23G 1/203; A23G 1/205; A23G 1/206; A23G 1/207; A23G 1/208; A23G 3/0025; A23G 3/0257; A23G 3/0289; A23G 3/007; A23G 7/0093; B29C 2043/468; B30B 11/16; B30B 11/165
USPC ................. 425/237, 375, 408, 447
See application file for complete search history.

(56) References Cited

U.S. PATENT DOCUMENTS 3,318,264 A * 5/1967 Weidenmiller ............... 425/362
4,059,378 A 11/1977 Sollich
(Continued)

FOREIGN PATENT DOCUMENTS

| | | |
|---|---|---|
| CH | 261353 A | 8/1949 |
| DE | 2540613 C2 | 3/1977 |

(Continued)

OTHER PUBLICATIONS

Foreign Search Report for 13177366.5-1656, dated Nov. 20, 2013.

*Primary Examiner* — Seyed Masoud Malekzadeh
(74) *Attorney, Agent, or Firm* — Thomas | Horstemeyer, LLP (57) ABSTRACT

An apparatus (1) for producing cores (33) of a fat-containing confectionery mass includes a molding apparatus (20) and a separate cooling apparatus (5). The molding apparatus (20) is cooled and serves to mold the cores (33). The molding apparatus (20) includes two molding rollers (23, 24) including a multitude of impressions (25). The molding rollers (23, 24) are driven in opposite directions. The impressions (25) hold the liquid confectionery mass flowing into the impressions (25) to form the cores (33). The cooling apparatus (5) includes a cooling roller (6) and is arranged upstream of the molding apparatus (20).

9 Claims, 4 Drawing Sheets

(52) U.S. Cl.
CPC ......... *A23G 3/0289* (2013.01); *A23G 7/0093* (2013.01); *A23G 1/202* (2013.01); *A23G 1/208* (2013.01)

(56) References Cited

U.S. PATENT DOCUMENTS

| | | | | |
|---|---|---|---|---|
| 4,468,186 | A * | 8/1984 | Sollich | 425/294 |
| 5,078,204 | A * | 1/1992 | Loffredo et al. | 165/89 |
| 5,358,727 | A * | 10/1994 | Yates et al. | 426/512 |
| 5,382,149 | A * | 1/1995 | Yates et al. | 425/237 |
| 5,667,824 | A * | 9/1997 | Ream et al. | 426/5 |
| 5,731,029 | A * | 3/1998 | Karwowski et al. | 426/646 |
| 5,733,587 | A * | 3/1998 | Ream et al. | 425/237 |
| 5,902,621 | A * | 5/1999 | Beckett et al. | 426/279 |
| 6,129,940 | A * | 10/2000 | Leadbeater | 426/515 |
| 6,182,556 | B1 * | 2/2001 | Nelson et al. | 99/331 |
| 6,267,997 | B1 * | 7/2001 | Ream et al. | 426/3 |
| 6,270,826 | B1 * | 8/2001 | Kashulines et al. | 426/512 |
| 6,482,516 | B1 * | 11/2002 | Sadek et al. | 428/402.24 |
| 6,764,293 | B2 * | 7/2004 | Kashulines et al. | 425/237 |
| 7,625,459 | B2 * | 12/2009 | Wu et al. | 156/244.24 |
| 2003/0148008 | A1 * | 8/2003 | Robinovitch et al. | 426/306 |
| 2003/0215585 | A1 * | 11/2003 | Bunick | 428/34.1 |
| 2004/0071834 | A1 * | 4/2004 | Dyks et al. | 426/100 |
| 2006/0040041 | A1 | 2/2006 | Shulski | |
| 2006/0134284 | A1 * | 6/2006 | Clarke et al. | 426/302 |
| 2007/0231435 | A1 * | 10/2007 | Ream et al. | 426/383 |
| 2011/0183044 | A1 * | 7/2011 | Zimmermann et al. | 426/90 |

FOREIGN PATENT DOCUMENTS

| | | | |
|---|---|---|---|
| DE | 2827404 A1 | 12/1979 | |
| DE | 69619478 T2 | 10/2002 | |
| FR | 2513858 | * 10/1981 | ............... A23G 3/06 |
| GB | 2023483 A | 1/1980 | |
| WO | 01/41583 A1 | 6/2001 | |
| WO | 03/005832 A1 | 1/2003 | |

* cited by examiner

APPARATUS AND METHOD FOR PRODUCING CHOCOLATE CORES

CROSS REFERENCE TO RELATED APPLICATIONS

This application claims priority to co-pending German Patent Application No. DE 10 2012 106 903.4 entitled "Vorrichtung and Verfahren zum Herstellen von Schokoladenkernen", filed Jul. 30, 2012.

FIELD OF THE INVENTION

The present invention generally relates to an apparatus and a method for producing cores of a fat-containing confectionery mass.

The apparatus includes a cooled molding apparatus for forming the cores. The molding apparatus includes two molding rollers including a multitude of impressions. The forming rollers are rotatingly driven in opposite directions. During the manufacturing process, the liquid confectionery mass flows into the impressions and solidifies there to form the cores.

Such apparatuses serve to produce massive cores of a fat-containing confectionery mass, especially chocolate. These cores may be buttons, eggs, spheres and similar shapes that can be produced by impressions being arranged in cooperating molding rollers.

BACKGROUND OF THE INVENTION

An apparatus and a method for producing cores of a fat-containing confectionery mass are known from German patent No. DE 696 19 478 T2 corresponding to U.S. Pat. No. 5,902,621. The apparatus includes an extruder into which semi-solidified non-flowable chocolate buttons are introduced. The chocolate strip produced thereby is fed into a molding apparatus including two oppositely driven molding rollers including a plurality of impressions. The non-flowable chocolate mass is then deformed to attain cores of chocolate in the molding apparatus. The chocolate mass is not treated with respect to its temperature in the extrusion apparatus or in the molding apparatus.

An apparatus and a method for producing bar-shaped confectioneries are known from German patent application No. DE 28 27 404 A1 corresponding to UK patent application No. GB 2 023 483 A. The confectionery mass in its liquid form is applied onto a cooling roller being rotatingly driven. In this way, a film of confectionery mass is formed on the surface area of the cooling roller. This film is then removed from the cooling roller, it is dropped onto a conveyor belt, and it is transported away as a strip. In the following, the strip can be fed to a further processing unit, for example to be cut into smaller strips or other product pieces.

Another apparatus for producing chocolate cores is generally known in the art. The known apparatus includes a cooled molding apparatus for forming the cores. The molding apparatus includes two molding rollers including a multitude of impressions into which the liquid chocolate mass flows to form the cores. The molding rollers are rotatingly driven in opposite directions. The liquid chocolate mass is tempered by a tempering machine being located upstream, and it is poured into the gap between the molding rollers being located next to one another in a horizontal direction. The molding rollers being driven in a synchronous way and in opposite directions then hold the liquid confectionery mass in the impressions.

The known molding rollers are strongly cooled such that the surface temperature of the molding rollers is substantially below the crystallization temperature of the chocolate mass. Thus, the viscosity of the chocolate mass is quickly increased and the chocolate mass solidifies during continued rotation of the molding rollers. The result is an endless strip having a thin layer and cores corresponding to the impressions in the molding rollers. This strip is then transported away by a conveyor belt.

There often is the problem with this known method that the strip sticks to the molding rollers and is thus not correctly dropped on the conveyor belt. Another problem is that the temperature decrease of the chocolate mass is not sufficiently attained by the molding rollers to attain the required level of solidification of the chocolate mass. Correspondingly, the cores are not yet stable enough when being dropped on the conveyor belt such that undesired deformation of the cores results. To reduce this problem, the rotational velocity of the molding rollers has to be reduced. However, this results in a decrease of the output of the apparatus.

SUMMARY OF THE INVENTION

The present invention relates to an apparatus for producing cores of a fat-containing confectionery mass. The apparatus includes a molding apparatus, the molding apparatus being designed and arranged to be cooled and to mold the cores. The molding apparatus includes two molding rollers including a multitude of impressions. The molding rollers are designed and arranged to be driven in opposite directions. The impressions are designed and arranged to hold the liquid confectionery mass flowing into the impressions to form the cores. The apparatus further includes a separate cooling apparatus including a cooling roller, the cooling apparatus being arranged upstream of the molding apparatus.

The present invention also relates to a method of producing cores of a fat-containing confectionery mass. The method includes the following steps: cooling the confectionery mass having a liquid and tempered condition in a cooling apparatus for reducing a temperature of the confectionery mass by between approximately 0.2 and 10° C. within a period of time of less than approximately 20 seconds to attain a liquid cooled confectionery mass; introducing the liquid cooled confectionery mass into a separate molding apparatus including two molding rollers including a multitude of impressions, the molding rollers being designed and arranged to be rotatingly driven in opposite directions, the cooled liquid confectionery mass flowing into the impressions to form the cores; cooling the cores by cooling the molding rollers to attain at least partly solidified cores; and removing the at least partly solidified cores from the impressions of the molding rollers.

DEFINITIONS

Fat-containing confectionery mass: A fat-containing confectionery mass is to be understood in this application as a chocolate mass or a different confectionery mass containing cacao butter and/or other fats.

Liquid confectionery mass: A liquid confectionery mass is to be understood in this application as a warmed up confectionery mass having a consistency suitable to be pumped.

Cores of confectionery mass: Cores of confectionery mass are to be understood in this application as including buttons, eggs, spheres and similar shapes that can be produced by molding with two cooperating molding rollers. The molding rollers include impressions into which the confectionery mass flows and in which it solidifies to define the shape of the cores. In other words, the core is formed by the combination of the impressions of the two molding rollers forming the mold.

FURTHER DESCRIPTION

In the prior art, the required cooling power has only been supplied by the cooled molding apparatus including the molding rollers including the impressions. By the novel apparatus and method, this cooling power is now partly transferred to a separate cooling apparatus being located upstream of the molding apparatus. This separate cooling apparatus especially includes a cooling roller especially including a smooth surface area and being rotatingly driven.

The novel apparatus and method for producing cores of a fat-containing confectionery mass are suitable for substantially increasing the output of the apparatus without negatively influencing the product quality.

After the confectionery mass has been treated with respect to temperature, it is applied onto the cooling roller in a heated and liquid form with a consistency suitable to be pumped. This treatment with respect to temperature ("tempering") has been preferably conducted in a tempering machine. A tempering machine especially serves to continuously process fat-containing masses, especially chocolate masses, by a heat treatment. The confectionery mass may contain cacao butter and/or other fat-containing masses. Such a mass is usually melted or at least heated up. The mass then has a liquid condition suitable for pumping, and it is substantially free of crystals. The mass is then tempered in the tempering machine, and it is further processed afterwards. For this purpose, the confectionery mass is especially pumped via conduits into the region of the cooling apparatus being located downstream.

Preferably, the confectionery mass is fed to the rotatingly driven cooling roller in a continuous and possibly in a controlled way. Feeding is advantageously realized in the upper region of the cooling roller being horizontally arranged. The confectionery mass is then distributed on the surface area of the cooling roller, and it is further conveyed therewith in the rotational direction as a thin film. During this contact between the confectionery mass and the cooling roller, thermal energy is withdrawn from the confectionery mass by the cooled cooling roller such that the desired partial cooling effect of the confectionery mass is attained. In this way, the cooled molding apparatus being arranged downstream does no longer have to provide the entire cooling power, but instead only a part of the overall cooling power to be supplied.

Cooling of the confectionery mass on the cooling roller is preferably realized so quickly that no new fat crystals are spontaneously formed at the contact surface between the cooling roller and the confectionery mass. The tempering level of the confectionery mass compared to the tempering level determined by the tempering machine is thus not changed or at least not substantially changed. The cooling period in the cooling apparatus is thus comparatively short, and it is especially in a region of less than 20 s, especially less than 10 s, especially less than 5 s, especially between approximately 1.5 and 3 s, especially approximately between 1.5 and 2 s, especially approximately 1.8 s and especially approximately 1.75 s. The temperature difference of the confectionery mass attained by cooling in the cooling apparatus is between approximately 0.2 and 10° C., especially between approximately 0.5 and 5° C., especially between approximately 0.5 and 2.5° C. and especially approximately 1° C.

In this connection, one makes use of the physical effect that slower forming of crystal structures results from accelerated cooling of the fat-containing confectionery mass. The final structure of a fat-containing confectionery mass, especially a chocolate mass, is comparatively solid and almost not elastically and plastically deformable. However, when rapid cooling of the fat-containing confectionery mass is realized by a comparatively low temperature—as this is the case with the novel cooling roller—a strong increase of the viscosity of the confectionery mass is attained without stable crystal structures already having been formed. Thus, the product mass in this condition is elastically and plastically deformable. The final solid crystal structure in the confectionery product is then attained in a unit being located downstream of the cooling apparatus and the molding apparatus. This unit may be especially a cooling tunnel.

In this way, this molding method using low temperatures for producing cores makes use of the special property of fat-containing confectionery masses in the sense of their flowing properties changing quicker than their crystal structure. The viscosity and the flow limit change proportionally to the temperature. The crystallization of the fat-containing confectionery mass instead depends on the temperature and on the time. Consequently, if the fat-containing confectionery mass is cooled in the cooled molding apparatus during a comparatively short period of time of a few seconds from the starting temperature of approximately 30 to 31.5° C. e.g. by approximately 5° C., the viscosity of the mass increases while the temperature of the mass decreases. The fat crystals in the liquid confectionery mass are formed in a substantially slower way.

The novel rapid cooling step results in crystallization occurring after a comparatively long period of time, for example after approximately 12 min. Depending on the process conditions, this period of time may also be up to 30 min or more. The fat-containing confectionery masses to be processed are often mixtures of fat, sugar, cacao components and/or milk powder. The fat components have very good creeping properties when the mass is still warm. During contact of the fat-containing confectionery mass with the cooled surface of the molding rollers of the molding apparatus, the liquid fat flows into the microscopically small irregularities in the surface of the impressions of the molding rollers. In the prior art, sticking of the confectionery mass to the molding rollers results therefrom. Due to the increase of the viscosity of the confectionery mass due to the defined cooling before introducing the confectionery mass into the impressions of the forming rollers, this effect can now be reduced by the novel method and apparatus. The novel method and apparatus thus result in the flowing properties of the fat-containing confectionery mass being increased by the preceding cooling step without negatively influencing the crystallization degree of the confectionery mass.

Depending on the kind of fat being used in the confectionery mass, a specific suitable temperature is adjusted with which the liquid confectionery mass is introduced into the impressions of the molding rollers of the molding apparatus. This temperature is lower compared to the prior art, and it has been realized by rapid cooling as this has been explained above. It is to be understood that the respective value is to be chosen depending on the kind of fat that is processed. If this mass is a dark compound mass including palm kernel fat, sugar and cacao mass, this temperature is approximately 31.5° C., for example. This temperature is approximately 29.5° C. for a dark chocolate covering or coating mass.

Generally, it is also imaginable to realize pre-cooling of the fat-containing confectionery mass by a different cooling apparatus, a tubular heat exchanger or directly by the tempering machine being located upstream. Such a cooling step would, however, result in undesired side effects. This is caused by the fact that the period of time within which the desired temperature decrease is realized is too long. Consequently, crystals are already formed, and the confectionery mass can no longer be deformed in the desired way. In addition, the conduits connecting the various machine components of the system would be clogged.

Due to the novel method and apparatus, outstanding advantages compared to the prior art are attained in practice. In practical experiments, the molding velocity has been doubled and thus the output of the apparatus has been doubled compared to the prior art. With the novel apparatus, practical experiments have attained molding velocities of at least approximately 6 m/min and even approximately 7.5 m/min. In the prior art, this value is approximately 2.6 m/min. In addition, with the novel method and apparatus, there are less production downtimes.

Another possibility is to use the increased efficiency of the method to design the molding rollers to be smaller than in the prior art and to thus reduce the tool costs and the production costs. Due to the partial cooling step with the novel separate cooling apparatus being located upstream, the same output or—depending on the size ratio—even a higher output compared to the prior art can be realized with these smaller molding rollers.

The number of rotations of the cooling roller is adjustable and controllable, respectively, such that an optimal layer thickness of the film of confectionery mass on the surface area of the cooling roller can be realized. For example, the number of rotations of the cooling roller having a diameter of between approximately 700 to 900 mm, especially between approximately 800 and 850 mm and preferably approximately 833 mm, may be approximately 1 to 2 revolutions per minute and especially approximately 1.5 revolutions per minute. For example, the thickness of the film of confectionery mass may be between approximately 1 to 5 mm and preferably between approximately 2 to 3 mm.

The cooling apparatus may include a film producing apparatus serving to form a liquid film of confectionery mass on the surface area of the cooling roller. Preferably, the thickness of the film of confectionery mass is adjustable by the film producing apparatus. The way how the film of confectionery mass is formed on the surface area may then be adjustable by the film producing apparatus as well as the number of rotations of the cooling roller in an individual way. Both parameters may then be adapted to the chosen confectionery mass as well as to the final product.

The adjustable film producing apparatus may include a film producing roller being supported in an eccentric way. The film producing roller itself then has a cylindrical shape, but it is supported in an eccentric way such that it can be fixed at different distances with respect to the surface area of the cooling roller. If it is desired to adjust a different thickness of the film of confectionery mass, the fixing means of the film producing apparatus is untightened, the distance to the surface are is newly adjusted and the fixing means is then tightened. The film producing apparatus is especially arranged approximately above the upper end of the horizontally aligned cooling roller. Preferably, it is arranged to be slightly displaced in the rotational direction of the cooling roller.

The cooling apparatus may include a stripper element (or doctor blade) serving to remove the liquid film of confectionery mass from the surface area of the cooling roller and to introduce the cooled liquid confectionery mass into the molding apparatus. This stripper element is preferably arranged in the lower region of the cooling roller being supported in a horizontal direction. In this region, the liquid confectionery film may be easily removed from the surface area, and it may then be discharged due to gravity and fed to the molding apparatus. The width of the cooling roller approximately corresponds to the width of the forming rollers such that uniform distribution of the pre-cooled confectionery mass onto the molding rollers is easily possible.

The cooling roller may include a double shell for passage of a cooling medium, especially cooling water. However, it is also possible to use a different cooling medium, for example cooled air. The temperature of the cooling medium can be adapted to the mass temperature such that the temperature difference is great enough as it is required for attaining the desired cooling effect. In this way, in combination with the reduced residual time, spontaneous forming of new fat crystals is prevented. The temperature of the cooling medium is especially between approximately 20 and 30° C., and preferably always higher than approximately 18° C. The cooling medium flows through the double shell of the cooling roller and thereby cools the film of confectionery mass located on the surface area of the cooling roller in the desired way. Due to the adjustment of the temperature of the cooling medium in combination with the conveying velocity of the cooling medium, the desired cooling effect can be adjusted.

In the step of cooling the cores by cooling the molding rollers, the temperature of the confectionery mass may be reduced by approximately 20 to 28° C. and especially by approximately 25° C. Due to pre-cooling which already took place, this is a smaller temperature difference than in the prior art. This cooling step is also realized by a cooling medium, especially cooling water. The cooling water especially has a share of an antifreeze fluid being chosen such that it may have a temperature of substantially below 0° C.—e.g. -20° C. or less—in the liquid condition.

The following table lists exemplary preferred values for producing cores of dark chocolate mass. The chocolate mass has been previously tempered by a disc tempering machine.

| Unit | Value |
| --- | --- |
| mass temperature at the entrance of the cooling apparatus | 30.5-31° C. |
| mass temperature at the exit of the cooling apparatus | 28-30° C. |
| residual time of the mass in the cooling apparatus | 1.5-3 s |
| temperature of the cooling medium at the entrance of the cooling apparatus | 25-29° C. |
| temperature of the cooling medium at the exit of the cooling apparatus | 26-30° C. |
| mass temperature at the entrance of the molding apparatus | 28.5° C. |
| mass temperature at the exit of the molding apparatus | 5° C. |
| temperature of the cooling medium at the entrance of the molding apparatus | -25° C. |
| temperature of the cooling medium at the exit of the molding apparatus | -23° C. |

It is to be understood that there are different values and different values are used, respectively, when different confectionery masses are processed.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if a cooling roller is mentioned, this is to be understood such that there is exactly one cooling roller or there are two cooling rollers or more cooling rollers. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Referring now in greater detail to the drawings, FIGS. 1 to 4 illustrate different components and views of a novel apparatus 1 for producing cores 33 of a fat-containing confectionery mass.

Figure 1:
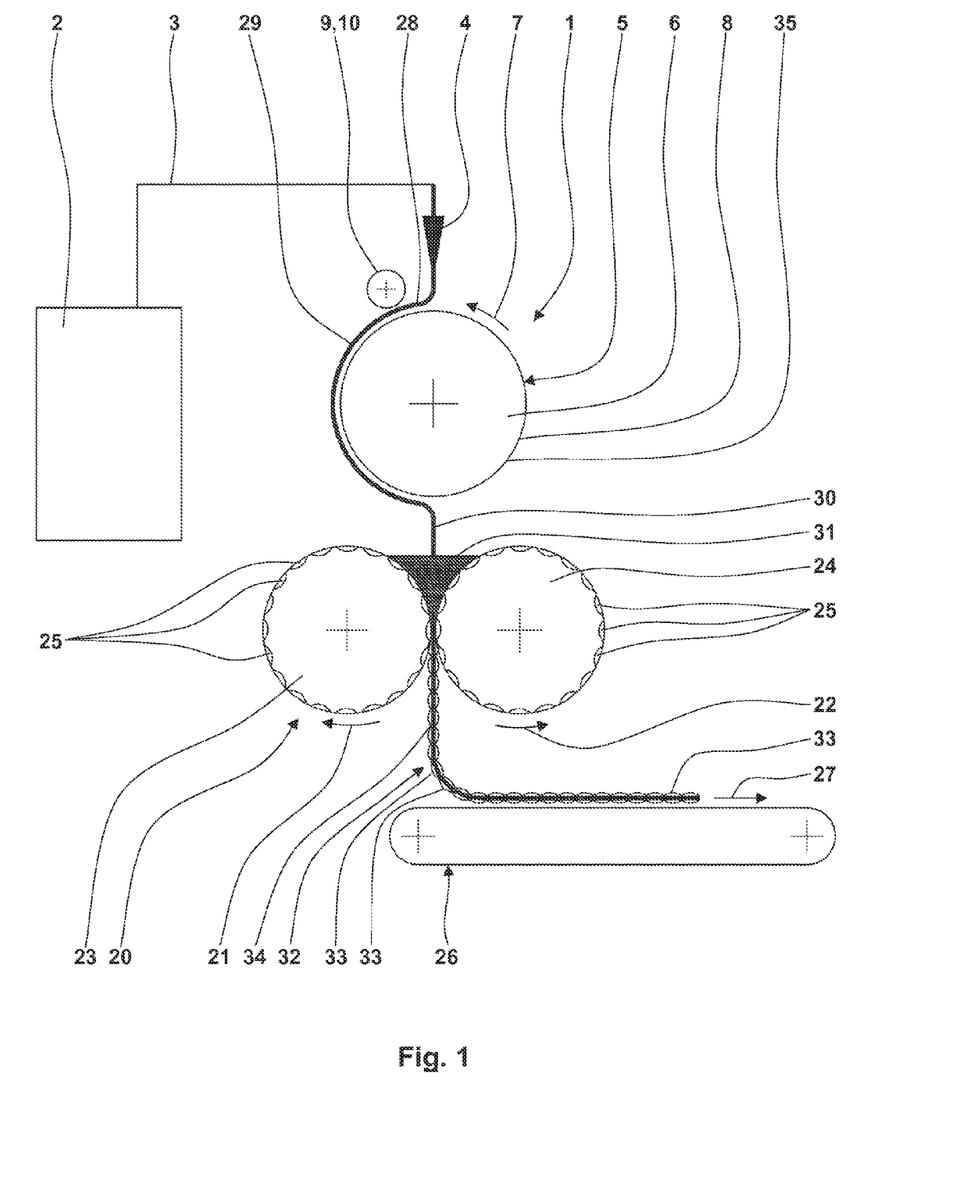
FIG. 1 is a simplified graphical representation of an exemplary embodiment of a novel apparatus for producing cores of fat-containing confectionery mass.

The fat-containing confectionery mass is treated with respect to temperature in a tempering machine 2 being arranged upstream of the apparatus 1 as this is generally known in the art. Especially, the mass is a chocolate mass. The tempered and thus flowable confectionery mass 28 is then fed to the apparatus 1 according to arrow 4 by a pump (not illustrated).

The apparatus 1 includes a cooling apparatus 5 including a cooling roller 6. However, it could also include a different cooling unit. The cooling roller 6 is rotatingly driven according to arrow 7 by a drive 14 (see FIG. 2), and it has a smooth surface area 8. The surface area 8 could also be designed not to be smooth, but it does not serve to determine the shape of the cores 33 to be produced.

Figure 2:
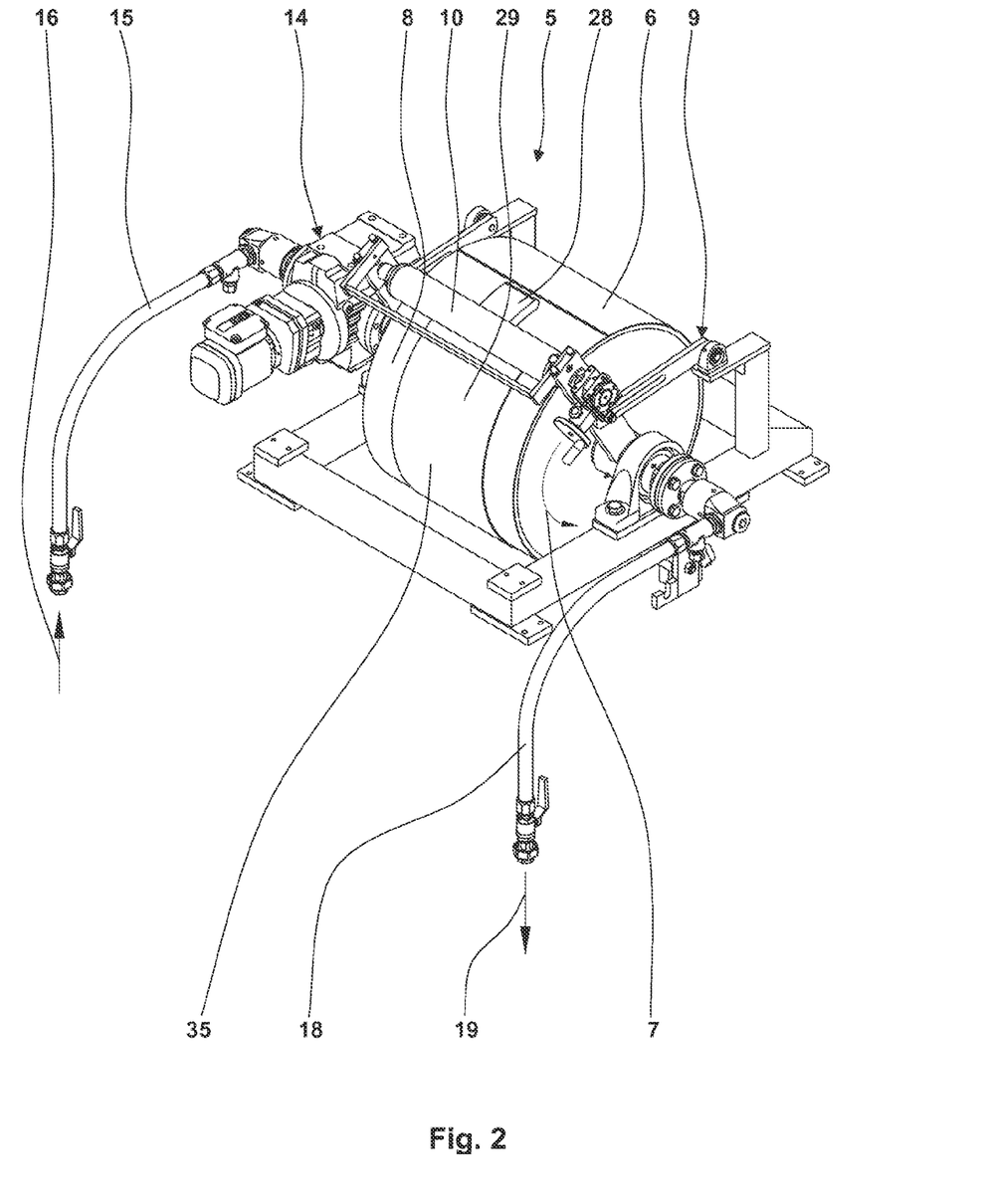
FIG. 2 is a perspective view of an exemplary embodiment of a novel cooling apparatus including a cooling roller.
Figure 3:
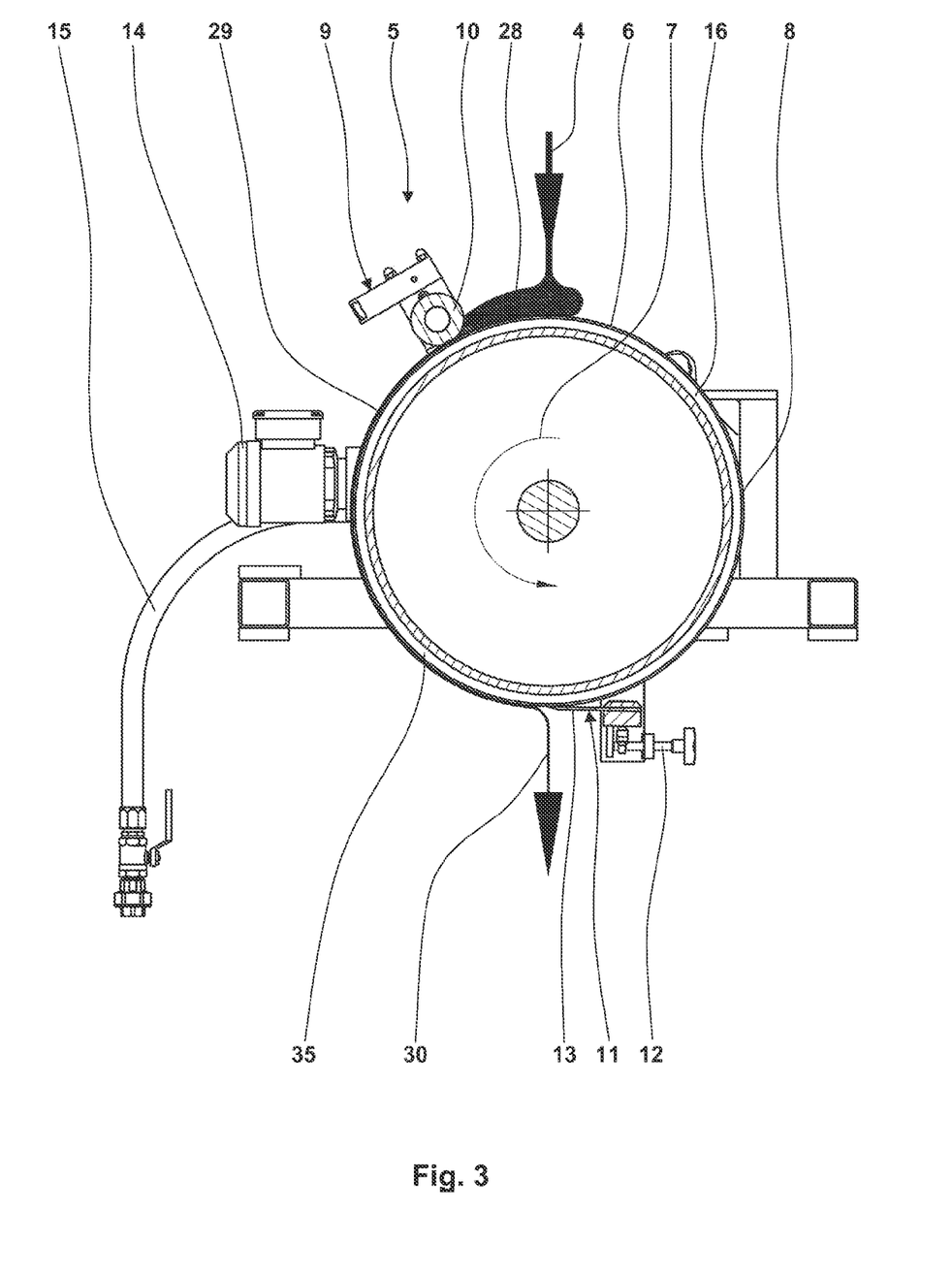
FIG. 3 is a partly sectional view of the cooling apparatus according to FIG. 2.

The cooling apparatus 5 further includes a film producing apparatus 9. In the illustrated example, the film producing apparatus 9 is designed to be adjustable and therefore includes a film producing roller 10 being supported in an eccentric way and associated adjustment means.

A stripper element 11 or doctor blade includes an adjustable holder 12 as well as a knife 13 which can be adjusted with respect to the surface area 8 of the cooling roller 6 such that the desired removal of the confectionery mass is attained.

Figure 4:
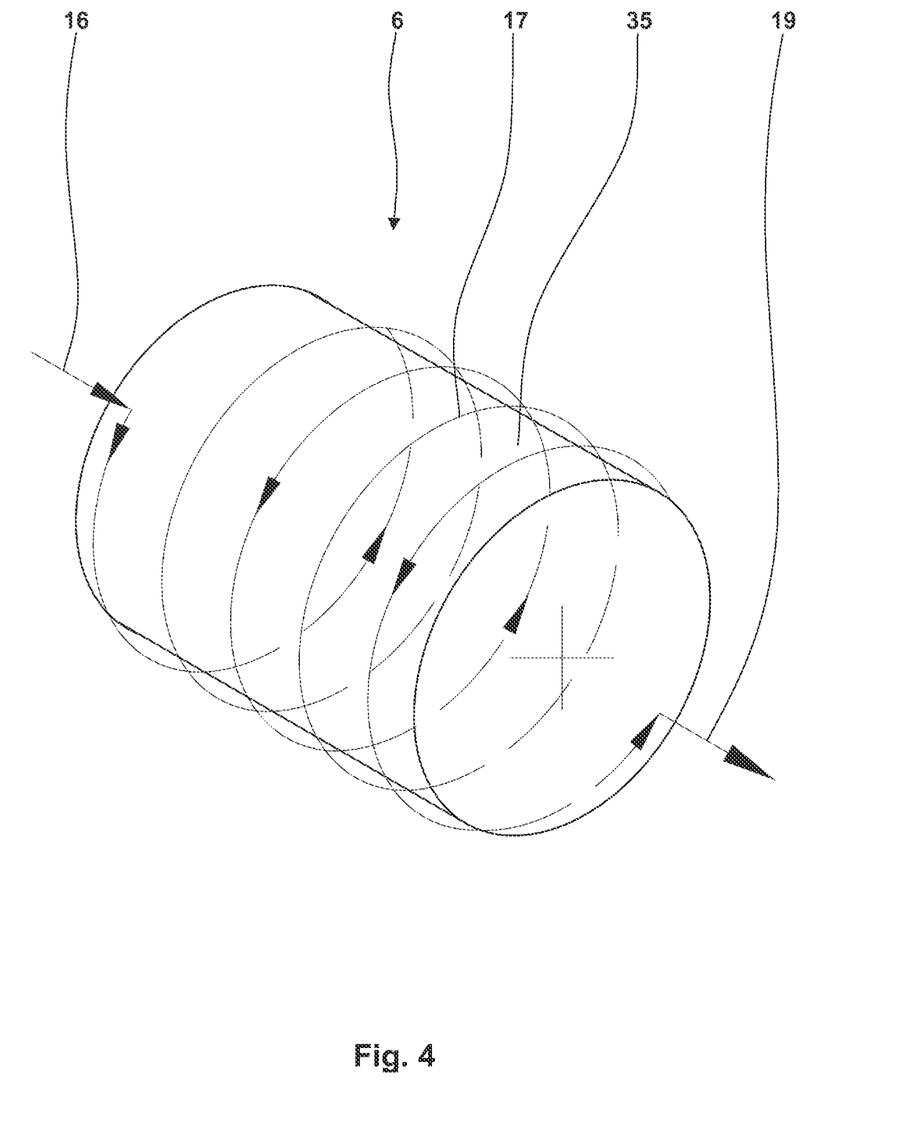
FIG. 4 is a simplified illustration of the flow of the cooling medium through the cooling roller according to FIGS. 2 and 3.

The cooling apparatus 5 includes another feeding conduit 15 for feeding a cooling medium, especially cooling water. The cooling medium is fed by a pump (not illustrated) in the direction of arrow 16 through a feeding conduit 15 and through the drive 14 into the region of the cooling apparatus 5. The cooling apparatus 5 includes a double shell 35 and thus cools the surface area 8 of the cooling roller 6. At the end of the cooling roller 6, the warmed up cooling medium then exits the cooling apparatus 5 through a discharge conduit 18 according to arrow 19.

A cooled molding apparatus 20 is arranged below and downstream of the cooling apparatus 5. The molding apparatus 20 includes two molding rollers 23, 24 which are driven in opposite directions according to arrow 21 and 22, respectively. Each of the molding rollers 23, 24 includes a multitude of impressions 25 into which the liquid confectionery mass can flow to form the cores 33. The impressions 25 are only schematically illustrated. It is to be understood that such spaced apart impressions 25 substantially extend over the entire surface area of the molding rollers 23, 24, and that they may have different shapes as this is known in the prior art. The molding apparatus 20 also includes a cooling apparatus for cooling the surface area of the molding rollers 23, 24 and thus for cooling the confectionery mass contained in the impressions 25. This cooling apparatus is not explained in more detail since it is already known from the prior art.

A conveyor belt 26 is arranged below and downstream of the molding apparatus 20. The conveyor belt 26 is driven according to arrow 27.

The novel method for producing cores 33 from a fat-containing confectionery mass, especially chocolate mass, is carried out as follows:

The confectionery mass 28 is treated with respect to temperature in the required way in the tempering machine 2, and it is fed by a pump (not illustrated) through the conduit 3 according to arrow 4 to the cooling apparatus 5.

The liquid confectionery mass 28 flows onto the surface area 8 of the cooling roller 6, and it is carried along thereby according to arrow 7. The film producing apparatus 9 defines the gap and thus the maximum thickness of the layer, and it distributes the liquid confectionery mass 28 on the surface area 8 of the cooling roller 6 to attain a liquid film of confectionery mass 29. Due to cooling of the cooling roller 6, the film of confectionery mass 29 is cooled during its transportation according to arrow 7. It is then removed from the surface area 8 by the stripper element 11 at a suitable location. In this case, this suitable location is the lower end of the cooling roller 6.

The cooled and still liquid confectionery mass 30 is then introduced into the separate molding apparatus 20 being arranged downstream. The cooled confectionery mass 30 is introduced into the region between the molding rollers 23, 24 such that the impressions 25 of the molding rollers 23, 24 are completely filled with cooled confectionery mass 30. To ensure complete filling, the cooled confectionery mass 30 can be introduced between the molding rollers 23, 24 in a way to form a reservoir of confectionery mass 31. Thus, the cooled confectionery mass 30 fills the impressions 25 as well as the gap between the forming rollers 23, 24, and it solidifies in this way due to cooling of the molding rollers 23, 24. At the lower end of the forming rollers 23, 24, an endless strip of confectionery mass 32 including the cores 33 and a thin layer 34 interconnecting the cores 33 exits. Removal of the at least partly solidified strip of confectionery mass 32 and thus of the cores 32 is automatically attained due to gravity, due to the opening molds being formed by the impressions 25 and due to discharging by the conveyor belt 26.

In the following, the strip of confectionery mass 32 is further processed, especially to form the desired crystals and to remove the cores 33 from the thin layer 34.

Many variations and modifications may be made to the preferred embodiments of the invention without departing substantially from the spirit and principles of the invention. All such modifications and variations are intended to be included herein within the scope of the present invention, as defined by the following claims.

We claim:

1. An apparatus for producing cores of a fat-containing confectionery mass, comprising:
    a cooling apparatus that receives the fat-containing confectionery mass in a heated liquid state in an upper region of the cooling apparatus, the cooling apparatus including a cooling roller being arranged horizontally and having an internal cooling mechanism that cools an outer surface of the cooling roller configured to apply a partial cooling effect on the fat-containing confectionary mass distributed on the outer surface of the cooling roller; and
    a separate molding apparatus positioned beneath the cooling apparatus that receives the partially-cooled liquid fat-containing confectionery mass as the partially-cooled liquid fat-containing confectionary mass drops from the cooling roller under the force of gravity, the molding apparatus being designed and arranged to be cooled to solidify and to mold the cores, the molding apparatus including two molding rollers including a multitude of impressions, the molding rollers being designed and arranged to be driven in opposite directions, and the impressions being designed and arranged to hold the partially-cooled fat-containing confectionery mass flowing into the impressions to form the cores.

2. The apparatus of claim 1, wherein the cooling roller is designed and arranged to be rotatingly driven.

3. The apparatus of claim 2, wherein the cooling apparatus further includes a film producing apparatus, the film producing apparatus being designed and arranged to form a liquid film of confectionery mass on the surface of the cooling roller.

4. The apparatus of claim 3, wherein the film producing apparatus is designed to be adjustable to adjust a thickness of the film of confectionery mass.

5. The apparatus of claim 4, wherein the film producing apparatus includes an eccentrically supported film producing roller.

6. The apparatus of claim 3, wherein the cooling apparatus further includes a stripper element, the stripper element being designed and arranged to remove the liquid film of confectionery mass from the surface of the cooling roller and enable the cooled liquid confectionery mass drop onto the molding apparatus.

7. The apparatus of claim 1, wherein the internal cooling mechanism of the cooling roller includes a double shell, the double shell being designed and arranged to allow for passage of a cooling medium.

8. The apparatus of claim 7, wherein the cooling medium is water.

9. The apparatus of claim 8, further comprising a feeding conduit that delivers the water to the cooling roller and a discharge conduit that removes the water from the cooling roller.

* * * * *